(12) United States Patent
Sung (10) Patent No.: US 9,329,456 B1
(45) Date of Patent: May 3, 2016

(54) UNDERWATER CAMERA (71) Applicant: Green Tech CO., LTD, Gumi-si, Gyeongsangbuk-do (KR)

(72) Inventor: Seuk Kyung Sung, Seoul (KR)

(73) Assignee: GREEN TECH CO., LTD., Seoul (KR)

( * ) Notice: Subject to any disclaimer, the term of this patent is extended or adjusted under 35 U.S.C. 154(b) by 0 days.

(21) Appl. No.: 14/848,542

(22) Filed: Sep. 9, 2015

(30) Foreign Application Priority Data

Oct. 16, 2014 (KR) ........................ 10-2014-0139998

(51) Int. Cl.
*G03B 17/08* (2006.01)
*H04N 5/225* (2006.01)
*G03B 15/03* (2006.01)

(52) U.S. Cl.
CPC ................ *G03B 17/08* (2013.01); *G03B 15/03* (2013.01); *H04N 5/2252* (2013.01); *H04N 5/2254* (2013.01); *H04N 2005/2255* (2013.01)

(58) Field of Classification Search
CPC ...................................................... G03B 17/08
See application file for complete search history.

(56) References Cited

U.S. PATENT DOCUMENTS

| | | | | | |
|---|---|---|---|---|---|
| 3,788,730 | A | * | 1/1974 | Greenleaf | G03B 17/08 359/665 |
| 5,067,855 | A | * | 11/1991 | Kamitani | B63C 11/02 405/186 |
| 5,107,286 | A | * | 4/1992 | Sergeant | H04N 5/2252 348/81 |
| 6,262,761 | B1 | * | 7/2001 | Zernov | G03B 15/03 348/61 |
| 7,522,834 | B2 | * | 4/2009 | Heaven | G01N 21/15 348/373 |

* cited by examiner

*Primary Examiner* — W B Perkey
(74) *Attorney, Agent, or Firm* — Dicke, Billig & Czaja, PLLC (57) ABSTRACT

Disclosed is an underwater camera, including: a casing having an accommodation space for a camera module; a connector coupled to a first side of the casing and transferring a signal output from the camera module to a controller; a lens connected to the lens and coupled to a second side of the casing in a manner that a periphery portion of the lens is embedded in the second side of the casing; a sealing means coupled to the second side of the casing and preventing water from entering into the casing and from reaching the lens; and a valve coupled to the first side of the casing and having a hose connected to a sealed space provided between the sealing means and a surface of the second side of the casing, thereby discharging air from the sealed space and supplying an inert gas into the sealed space.

9 Claims, 5 Drawing Sheets

UNDERWATER CAMERA

CROSS REFERENCE TO RELATED APPLICATION

The present application claims priority to Korean Patent Application No. 10-2014-0139998, filed Oct. 16, 2014, the entire contents of which is incorporated herein for all purposes by this reference.

BACKGROUND OF THE INVENTION

1. Field of the Invention

The present invention relates to an underwater camera and, more particularly, to an underwater camera structured to prevent a camera lens from fogging and from being damaged under high pressure in deep water.

2. Description of the Related Art

A camera device called "Autonomous cam" or "Robotic cam" is used to capture images in extreme environmental conditions, for example, places where people cannot endure.

A robotic camera can be remote-controlled.

Patent Document 1 (Korean Patent No. 10-1253767 (registered on Apr. 5, 2013), titled "Underwater Searching Device using Camera") discloses a related art of a conventional underwater camera. The underwater searching camera includes: a body; a first rotational shaft that is rotatably coupled to a first side of the body and connected to a leading end of a support pole; a second rotational shaft that is perpendicular to the first rotational shaft and is rotatably coupled to a second side of the body; a first rotation controller including a first ring-shaped rotating unit that is rotatably coupled to the first rotational shaft and has a first arm extending in a radial direction of the first rotational shaft, a first side-protrusion that rotates in a state in which it is fixed to the first rotational shaft, is bent sideways to cross the first arm, and changes a position of the first arm according to rotation of the first rotational shaft, and a pair of first stoppers that are distanced from the first rotational shaft, are distanced from each other with the first arm therebetween, protrude to cross the first arm, and alternately come in contact with the first arm; a support bracket that is connected to the second rotational shaft, is rotatably coupled to an outside surface of the body, and rotates in a direction perpendicular to a rotation direction of the first rotational shaft; and a camera fixed to the support bracket.

Patent Document 2 (Korean Utility Model Registration No. 20-0338396 (registered on Jan. 5, 2004), titled "Lens Control Device of Watertight Case for Underwater Camera") discloses another related art of a conventional underwater camera. The lens control device includes: a watertight case that accommodates an underwater camera therein in a watertight manner; a fixing unit that is structured to be inserted into the watertight case at a predetermined angle through a side portion of the watertight case and has a fixing ring at a lower end thereof so as to rotate while being in tight contact with a lens focusing unit; and an adjusting unit having holding portions at an end thereof to hold the fixing unit in a manner that the fixing unit can be rotated left and right.

Capturing quality pictures or videos is difficult with conventional underwater cameras due to lens-fogging attributable to a temperature difference between water and the atmosphere. Even further, conventional underwater cameras suffer from damage of lenses due to high pressure in deep water.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide an underwater camera structured to prevent a lens from being damaged due to a pressure in water during underwater image-capturing and to prevent a lens from fogging due to a temperature change when the camera is put into water.

In order to accomplish the above object, one aspect of the present invention provides an underwater camera including: a casing having an accommodation space in which a camera module is accommodated; a connector that is coupled to a first side of the casing and transfers a signal output from the camera module to a controller installed outside the casing; a lens that is connected to the camera module and coupled to a second side of the casing in a manner that a periphery portion of the lens is embedded in a portion of the second side of the casing; a sealing means that is coupled to the second side of the casing and prevents water from reaching the lens; and a valve that is coupled to the first side of the casing and has a hose connected to a sealed space provided between the sealing means and a surface of the second side of the casing, thereby discharging air from the sealed space outside and supplying an inert gas into the sealed space.

Another aspect of the present invention provides an underwater camera, including: a casing having an accommodation space in which a camera module is accommodated; a connector that is coupled to a first side of the casing and transfers a signal output from the camera module to a controlled installed outside the casing; a lens that is connected to the camera module and coupled to a second side of the casing in a manner that a periphery portion of the lens is embedded in a portion of the second side of the casing; a sealing means that is coupled to the second side of the casing and prevents water from reaching the lens; and a valve that is coupled to the first side of the casing, purges air in a sealed space provided between the sealing means and a surface of the second side of the casing and air in the accommodation space, and supplies an inert gas into the sealed space and the accommodation space.

In the underwater camera, the sealing means may include: an extended protrusion that protrudes from a surface of the second side of the casing near the lens and has a threaded inside circumferential surface and a threaded outside circumferential surface; a first sealing member that is inserted into the extended protrusion and arranged to surround one surface of the lens; a first nut that is screwed along the threaded inside circumferential surface of the extended protrusion to press and support the first sealing member; a first window member arranged between the first sealing member and the first nut; a second sealing member that is screwed along the threaded outside circumferential surface of the extended protrusion and is in tight contact with the surface of the second side of the casing; a second window member that is inserted into the extended protrusion and arranged to be in contact with an outside surface of the second sealing member; a second nut that is screwed along the outside surface of the extended protrusion and presses and supports the second window member and the second sealing member; a cap member that is screwed with a portion of the second side of the casing and has a through hole in a center portion thereof; and a third sealing member that is arranged between an inside circumferential surface of the cap member and the second window member.

The underwater camera may further include a light-emitting unit that is arranged in the second side of the casing and illuminates when powered.

The inert gas may be nitrogen gas.

The casing may have a channel that communicates with the sealed space, thereby being capable of introducing the inert gas into a space provided between the sealing means and an outside surface of the lens.

The casing may have a gas channel through in a surface of the second side thereof and the sealed space and the accommodation space communicate with each other through the gas channel.

The present invention has an advantage of enhancing durability of a lens and a window member based on a phenomena that an inert gas is introduced into a sealed space of the underwater camera to increase an internal pressure of an underwater camera and the increased internal pressure acts as a compensative pressure with respect to water pressure externally applied to the underwater camera.

In addition, the present invention has an advantage of preventing a lens from fogging due to a temperature change that a conventional underwater camera is likely to experience when it is put into water, by purging air containing moisture that exists in the sealed space of the underwater camera and introducing nitrogen gas (i.e. inert gas) into the purged sealed space.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings.

The present invention provides a technology by which an internal space of an underwater camera that is used in underwater conditions to capture images of underwater environments is filled with an inert gas. This technology prevents a lens from fogging due to a temperature change that the underwater camera experiences when it is put into water and prevents a lens from being damaged due to a high underwater pressure.

Figure 1:
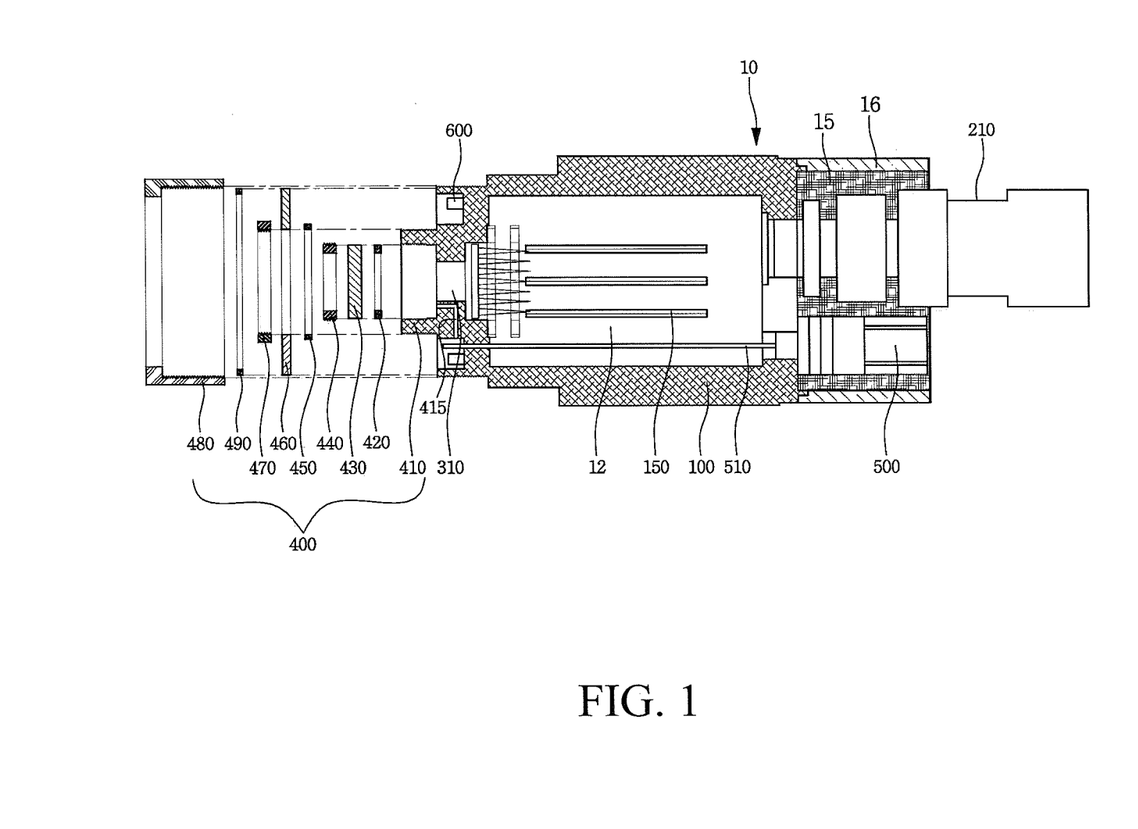
FIG. 1 is a diagram illustrating an underwater camera according to a first embodiment of the present invention.
Figure 2:
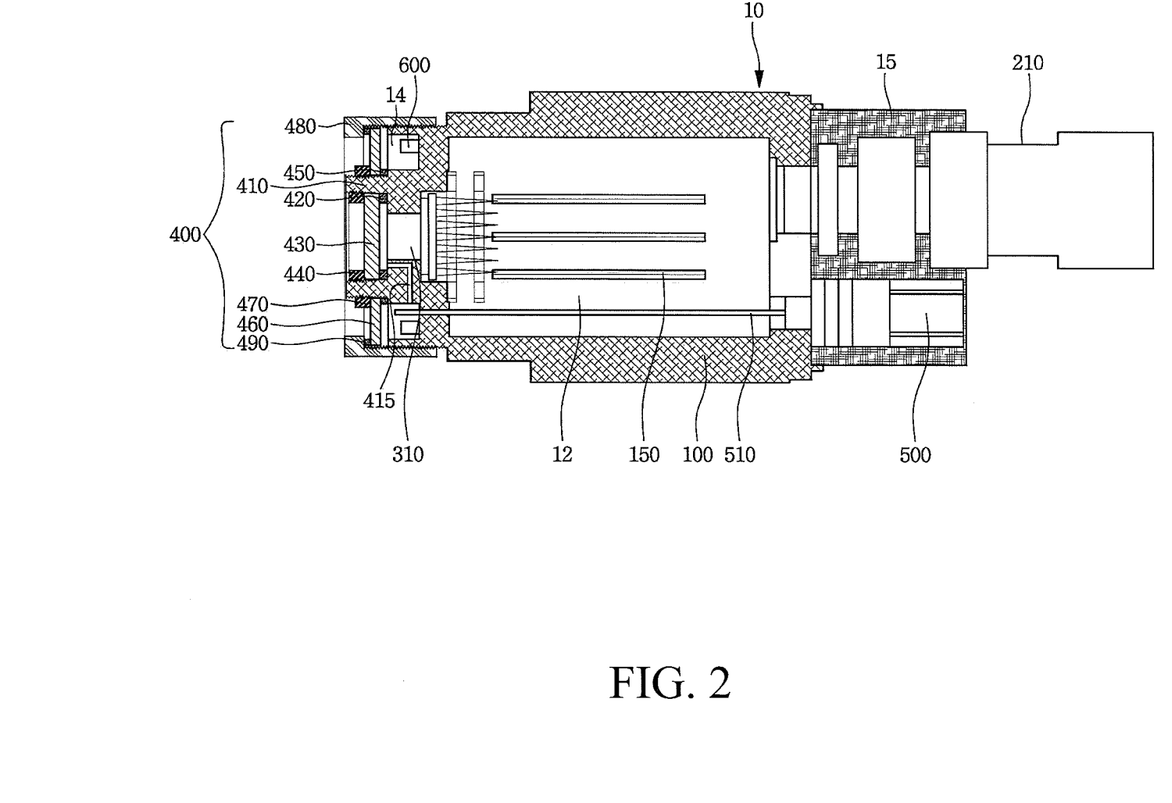
FIG. 2 is an assembled state of the underwater camera of FIG. 1.

With reference to FIGS. 1 and 2, an underwater camera according to a first embodiment of the present invention will be described below. The underwater camera according to the first embodiment includes a casing 100, a connector 210, a lens 310, a sealing means 400, and a valve 500.

The casing 100 has an accommodation space 12 therein in which a camera module 150 is to be accommodated. The connector 210 is coupled to a first side of the casing 100 and transfers a signal output from the camera module 150 to a controller (not shown) installed outside the casing 100. The lens 310 is connected to the camera module 150 and coupled to a second side of the casing 100 in a manner that a periphery portion of the lens 310 is embedded in the casing 100. The sealing means 400 is coupled to the second side of the casing 100 and prevents water from entering into the casing 100 and from reaching the lens 310. The valve 500 includes a hose 510 that is coupled to the first side of the casing and connected to a sealed space 14 in order to purge air existing in the sealed space disposed between the sealing means 400 and a surface of the second side of the casing 100 and to supply an insert gas into the sealed space 14.

The casing 100 is a cylindrical body having the accommodation space 12 therein and is equipped with the connector 210 for electrical connection. The casing 100 is combined with the valve 500 that functions to supply an inert gas into the casing 100.

The lens 310 is embedded in the second side of the casing 100 in a manner that only an outer surface of the lens 310 is exposed to the outside.

The camera module 150 is accommodated in the casing 100. The camera module 150 is connected to the lens 310, converts an image projected through the lens 310 into an electronic signal, and outputs the electronic signal.

The connector 210 is electrically connected to the camera module 150 and transfers the electronic signal output from the camera module 150 to the controller.

The valve 500 is connected to the house member 510 connected to the casing 100. The valve 500 may be connected to an air purging facility and an inert gas charger that can charge an inert gas.

The hose 510 serves as an air suction path through which air or gas containing moisture that exists in the casing 100 can be discharged outside, so that the inside of the casing 100 can be vacuumized. The house member 510 also serves as a charging path through which an inert gas is introduced into the casing 100.

The inert gas is preferably nitrogen gas in terms of production cost and safety. After the air in the casing 100 is purged, nitrogen gas is introduced into the casing 100 through the valve 500.

By introducing moisture-free nitrogen gas into the casing 100, it is possible to prevent an inside surface of the lens 310 from fogging due to a temperature change that an underwater camera undergoes when it is put into water.

The sealing means 400 includes an extended protrusion 410, a first sealing member, a first nut 440, a first window member 430, a second sealing member 450, a second window member 460, a second nut 470, a cap member 480, and a third sealing member 490. The extended protrusion 410 protrudes from the second side of the casing 100 near the lens 310. The extended protrusion 410 is open at one end thereof. An inside surface and an outside surface of the extended protrusion 410 are threaded and herein referred to as first threaded surface and second threaded surface, respectively. The first sealing member 420 is inserted into the extended protrusion 410 and surrounds one surface of the lens 310. The first nut 440 is screwed in the first threaded surface (i.e. inside surface) of the extended protrusion 410, thereby pressing and supporting the first sealing member 420. The first window member 430 is arranged between the first sealing member 420 and the first nut 440. The second sealing member 450 is combined with the outside surface of the extended protrusion 410 and comes into tight contact with the second side of the casing 100. The second window member 460 is inserted into the extended protrusion 410 and is arranged to be in contact with the outside surface of the second sealing member 450. The second nut 470 is screwed on the outside surface of the extended protrusion 410 to press and support the second sealing member 450. The cap member 480 is screwed with a portion of the second side of the casing 100. The third sealing member 490 is arranged between the inside surface of the cap member 489 and the second window member 460.

The first, second, and third sealing members 420, 460, and 490 may be made of an elastic material.

Preferably, the first and second window members 430 and 460 may be made of a transparent material such as glass so that an image that is captured underwater can be projected on the lens 310.

The second window member 460 has an insertion hole in a center portion thereof so that the extended protrusion 410 can be inserted into the insertion hole of the second window member 460.

A channel 415 that communicates with the sealed space 14 is formed in the extended protrusion 410 so that an insert gas can be introduced into a space between the cap member 480 and the lens 310.

The channel 410 may serve as a gas supply path through which the internal space between the sealing means 400 and the lens 310 can be filled with an inert gas.

A connecting cover 16 is detachably attached to the first side of the casing 100. A synthetic resin member 15 may be supplied to an inside surface of the connecting cover and is then gradually cured over time, thereby fixing the connector and the valve 500 to the surface of the first side of the casing 100.

The connecting cover 16 may be removed from the casing 100 after the synthetic resin member 15 is completely cured.

A process of assembling the sealing means 400 and the casing 100 with each other will be described below. The first sealing member 420 is arranged inside the extended protrusion 410 that extends and protrudes from the second side of the casing 100 in a manner of surround an outside surface of the lens 310. The first window member 430 is inserted into the extended protrusion 410 to be in tight contact with the outside surface of the first sealing member 420. Next, the first nut 440 is screwed along the first threaded surface (inside surface of the extended protrusion), thereby supporting and pressing the first window member 430 and the sealing member 420 in an outward direction of the casing 100.

The second sealing member 450 is assembled to be in tight contact with the second side of the casing 100 that is disposed outside the extended protrusion 410 so as to be inserted into the extended protrusion 410. The second window member 460 is arranged to be in contact with the second sealing member 450 in a position outside the extended protrusion 410. Next, the second nut 470 is screwed along the second threaded surface (outside surface) of the extended protrusion 410 until the second window member 460 and the second sealing member 450 are pressed.

The third sealing member 490 is arranged to be in tight contact with the outside surface of the second window member 460, and the cap member 480 is screwed along the outside surface of the casing 100 at the second side of the casing 100.

The sealing means 400 seals a portion of the second side of the casing 100, forming a sealed space 14 in the second side of the casing 100. The sealing means 400 has a triple sealing structure made up of three sealing members, two nuts, and two window members.

When the casing 100 and the sealing means 400 are assembled as described above, the accommodation space 12 in the casing 100 and the sealed space 14 disposed between the outside surface of the casing 100 and the cap member 480 are separate from each other. In this state, air in the sealed space 14 is purged through the valve 500 and then an inert gas is charged into the sealed space 14 by connecting the inert gas charger to the valve 500.

By connecting the inert gas charger to the valve 500, the inert gas is introduced not only into the sealed space 14 but also supplied to an outside surface of the lens 310 through the channel 415 formed in the extended protrusion 410.

Therefore, the internal pressure of the underwater camera rises due to an increase of the pressure of the inert gas introduced into the sealed space 14, and the increased pressure in the sealed space 14 acts as a compensative pressure with respect to the water pressure externally applied to the underwater camera. Therefore, durability of the lens 310 and the first and second window members 430 and 460 can be enhanced.

Furthermore, since air containing moisture that exists in the sealed space 14 is purged through the valve 500 and then the purged sealed space 14 is refilled with nitrogen gas (inert gas), it is possible to prevent the lens 310 from fogging due to a temperature change that the underwater camera experiences when it is put into water.

Figure 3:
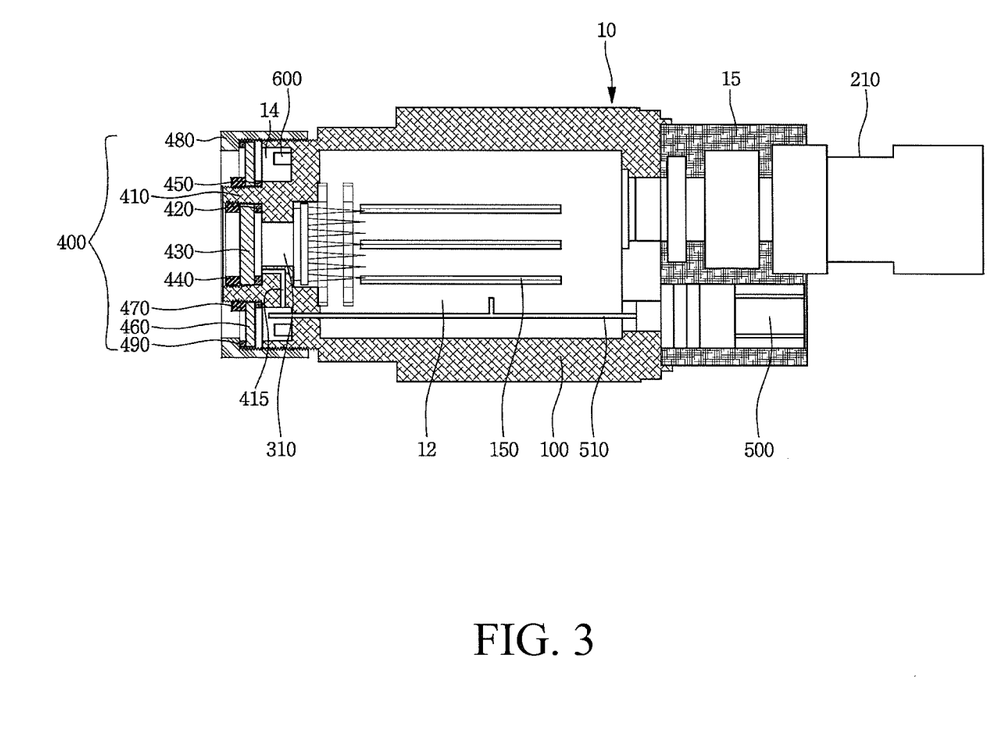
FIG. 3 is a diagram illustrating an underwater camera according to a second embodiment of the present invention.

With reference to FIG. 3, an underwater camera according to a second embodiment of the present invention will be described below. The underwater camera according to the second embodiment includes a casing 100, a connector 210, a lens 310, a sealing means 400, and a valve 500. The casing 100 has an accommodation space in which a camera module 150 is to be accommodated. The connector 210 is coupled to a first side of the casing 100 and transfers a signal output from the camera module 150 to a controller installed outside. The lens 310 is coupled to a second side of the casing 100 in a manner that a periphery portion of the lens 310 is embedded in the casing 310. The lens 310 is connected to the camera module 150. The sealing means 400 is coupled to the second side of the casing 100 and prevents water from entering into the casing 100 and from reaching the lens 310. The valve 500 is coupled to the first side of the casing 100. The valve 500 functions to purge air existing in a sealed space 14 provided between the sealing means 400 and the second side of the casing 100 and air in the accommodation space 12. The valve 500 has a hose 510 connected to the sealed space 14 and the accommodation space 12 so that an inert gas can be introduced into the sealed space 14 and the accommodation space 12 via the valve 500.

The second embodiment is the same as the first embodiment in terms of the structure of the casing 100 and the sealing means 400 but differs in terms of the structure of the valve 500. In the second embodiment, air in the sealed space 14 and air in the accommodation space 12 are simultaneously purged, and then the sealed space 14 and the accommodation space 12 are refilled with nitrogen gas (inert gas).

An inert gas-filling process includes a step of vacuuming the sealed space 14 and the accommodation space 12 by purging air in the sealed space 14 and air in the accommodation space via the hose 510 of the valve 500, which has an end communicating with the accommodation space 12 and the sealed spaced 14, and a step of introducing an inert gas into the sealed space 14 and the accommodation space 12 through the hose 510 by connecting a nitrogen charger to the valve 500.

At this point, a pressure rises due to an increase in the pressure of the inert gas in the accommodation space 12 and the sealed space 14 and acts as a compensative pressure with respect to the water pressure externally applied to the camera in water. Therefore, durability of the lens 310 and the first and second window members 420 and 460 can be enhanced.

Since air containing moisture that exists in the accommodation space 12 and the sealed space 14 is purged via the valve 500 and afterward, nitrogen gas (inert gas) is introduced into the accommodation space 12 and the sealed space 14, it is possible to prevent the lens 310 from fogging due to a temperature change occurring when the camera is put into water.

Figure 4:
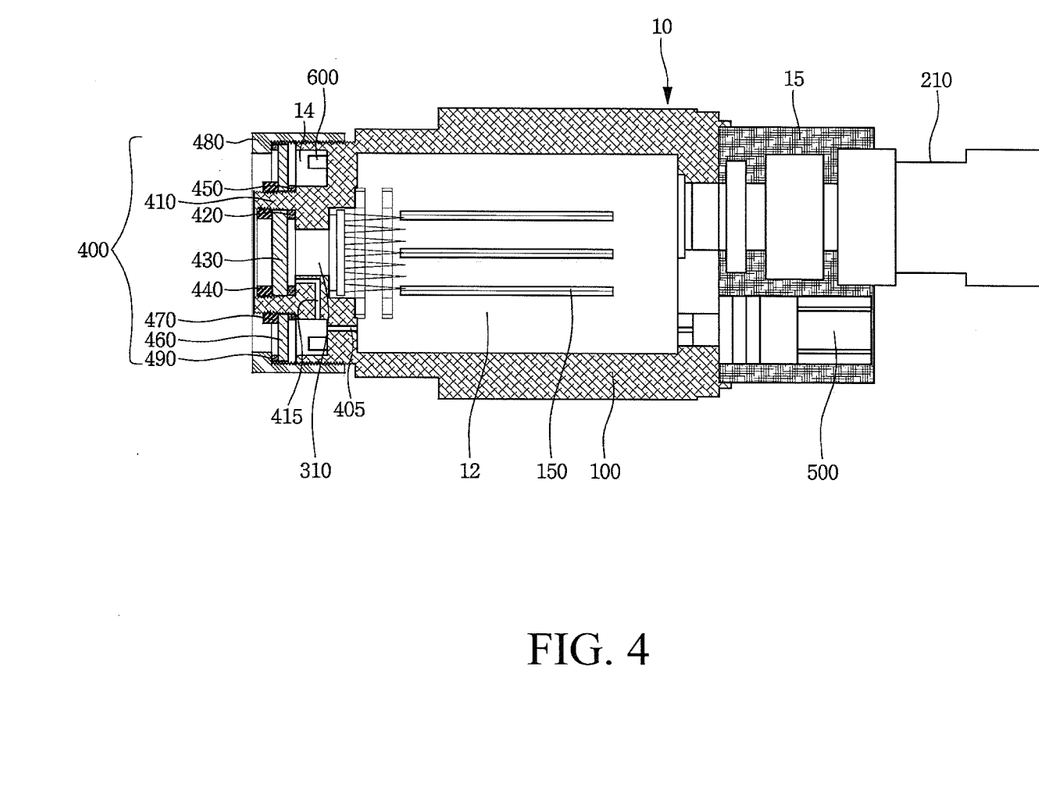
FIG. 4 is a diagram illustrating an underwater camera according to a third embodiment of the present invention.

FIG. 4 is a diagram illustrating an underwater camera according to a third embodiment. The third embodiment differs from the second embodiment in that the underwater camera according to the third embodiment does not include the hose 510 but has a gas channel 405 formed in a second side of a casing 100 instead of the hose 510. The gas channel 405 communicated with an accommodation space 12 and a sealed space 14. Therefore, an inert gas supplied via a valve 500 is introduced into the sealed space 14 via the accommodation space 12.

In the third embodiment, the accommodation space 12 and the sealed space 14 are formed to communicate with each other through the gas channel 105. Therefore, air in the accommodation space 12 and the sealed space 14 can be purged through the gas channel 105. In addition, an inert gas is first supplied to the accommodation space 12 via the valve 500 and then to the sealed space 14 through the gas channel 105. The gas is then supplied to the lens 310 via a channel 415.

As shown in FIGS. 1, 3, and 4, in each of the first to third embodiments of the present invention, the underwater camera may include a light-emitting unit 600 that is arranged in the second side of the casing 100 and illuminates when powered.

Figure 5:
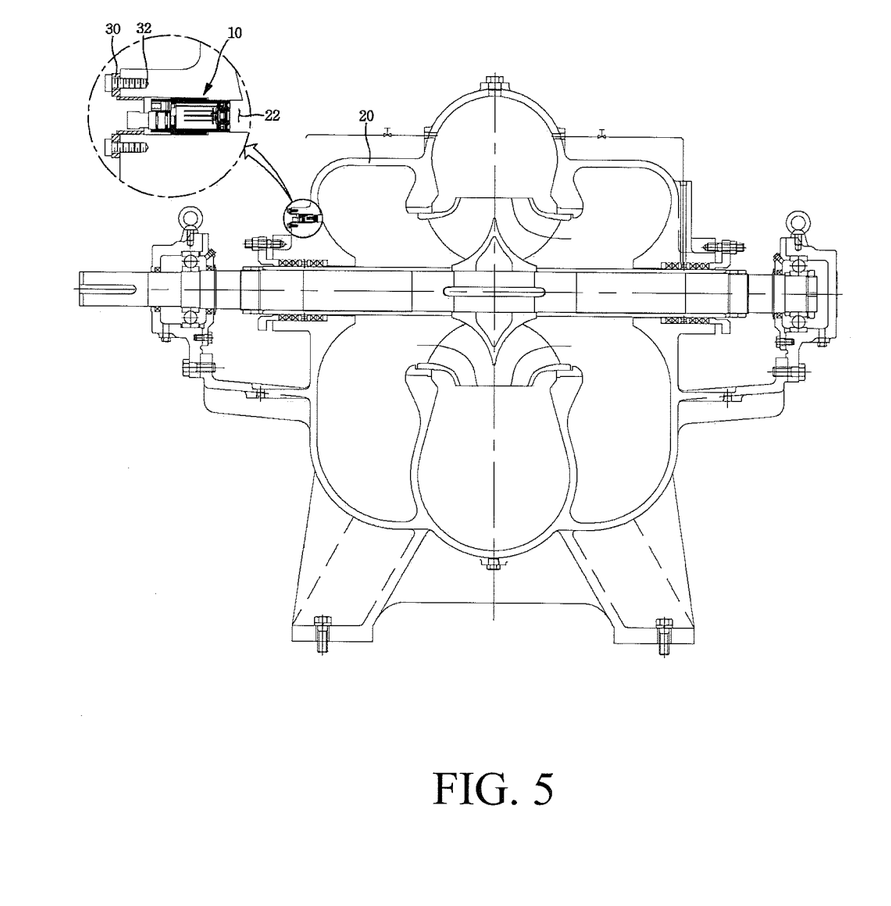
FIG. 5 is a diagram illustrating an underwater camera according to a fourth embodiment of the present invention.

FIG. 5 is a diagram illustrating a state in which an underwater camera according to the present invention is connected to a pump. The underwater camera 10 is inserted into a connection hole formed in a housing 20 of the pump. In order to fix the underwater camera 10, an end of a gland 30 is in contact with a first portion of a casing 100 of the underwater camera 10 and the other end of the gland 30 is bent and connected to the housing of the pump using a coupling member 32 such as a screw or a bolt.

Accordingly, the underwater camera according to the present invention has an advantage of enhancing durability of the lens 310 and window members because an inert gas that is introduced into the sealed space 14 provides a compensative pressure with respect to water pressure externally applied.

The underwater camera according to the present invention has another advantage of preventing the lens 310 from fogging due to a temperature difference between inside and outside the lens in water by purging air containing moisture that exists in the sealed space through the valve 500 and then introducing nitrogen gas (inert gas) into the sealed space 14.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An underwater camera, comprising:
  a casing having an accommodation space in which a camera module is accommodated;
  a connector that is coupled to a first side of the casing and transfers a signal output from the camera module to a controller installed outside the casing;
  a lens that is connected to the camera module and coupled to a second side of the casing in a manner that a periphery portion of the lens is embedded in a portion of the second side of the casing;
  a sealing means that is coupled to the second side of the casing and prevents water from reaching the lens; and
  a valve that is coupled to the first side of the casing and has a hose connected to a sealed space provided between the sealing means and a surface of the second side of the casing, thereby discharging air from the sealed space outside and supplying an inert gas into the sealed space,
  wherein the sealing means includes:
    an extended protrusion that protrudes from a surface of the second side of the casing near the lens and has a threaded inside circumferential surface and a threaded outside circumferential surface;
    a first sealing member that is inserted into the extended protrusion and arranged to surround one surface of the lens;
    a first nut that is screwed along the threaded inside circumferential surface of the extended protrusion to press and support the first sealing member;
    a first window member arranged between the first sealing member and the first nut;
    a second sealing member that is screwed along the threaded outside circumferential surface of the extended protrusion and is in tight contact with the surface of the second side of the casing;
    a second window member that is inserted into the extended protrusion and arranged to be in contact with an outside surface of the second sealing member;
    a second nut that is screwed along the outside surface of the extended protrusion and presses and supports the second window member and the second sealing member;
    a cap member that is screwed with a portion of the second side of the casing and has a through hole in a center portion thereof; and
    a third sealing member that is arranged between an inside circumferential surface of the cap member and the second window member.

2. The underwater camera according to claim 1, further comprising a light-emitting unit that is arranged in the second side of the casing and illuminates when powered.

3. The underwater camera according to claim 1, wherein the inert gas is nitrogen gas.

4. The underwater camera according to claim 1, wherein the casing has a channel that communicates with the sealed space and the inert gas into is introduced into a space provided between the sealing means and an outside surface of the lens through the channel.

5. An underwater camera, comprising:
  a casing having an accommodation space in which a camera module is accommodated;
  a connector that is coupled to a first side of the casing and transfers a signal output from the camera module to a controller installed outside the casing;
  a lens that is connected to the camera module and coupled to a second side of the casing in a manner that a periphery portion of the lens is embedded in a portion of the second side of the casing;
  a sealing means that is coupled to the second side of the casing and prevents water from reaching the lens; and
  a valve that is coupled to the first side of the casing, purges air in a sealed space provided between the sealing means and a surface of the second side of the casing and air in the accommodation space, and supplies an inert gas into the sealed space and the accommodation space;
  wherein the sealing means includes:
    an extended protrusion that protrudes from a surface of the second side of the casing near the lens and has a threaded inside circumferential surface and a threaded outside circumferential surface;

a first sealing member that is inserted into the extended protrusion and arranged to surround one surface of the lens;

a first nut that is screwed along the threaded inside circumferential surface of the extended protrusion to press and support the first sealing member;

a first window member arranged between the first sealing member and the first nut;

a second sealing member that is screwed along the threaded outside circumferential surface of the extended protrusion and is in tight contact with the surface of the second side of the casing;

a second window member that is inserted into the extended protrusion and arranged to be in contact with an outside surface of the second sealing member;

a second nut that is screwed along the outside surface of the extended protrusion and presses and supports the second window member and the second sealing member;

a cap member that is screwed with a portion of the second side of the casing and has a through hole in a center portion thereof; and a third sealing member that is arranged between an inside circumferential surface of the cap member and the second window member.

6. The underwater camera according to claim 5, further comprising a light-emitting unit that is arranged in the second side of the casing and illuminates when powered.

7. The underwater camera according to claim 5, wherein the inert gas is nitrogen gas.

8. The underwater camera according to claim 5, wherein the casing has a channel that communicates with the sealed space and the inert gas into is introduced into a space provided between the sealing means and an outside surface of the lens through the channel.

9. The underwater camera according to claim 5, wherein the casing has a gas channel in a surface of the second side and the sealed space and the accommodation space communicate with each other through the gas channel.

* * * * *